(12) United States Patent
Simm et al.

(10) Patent No.: US 9,108,283 B2
(45) Date of Patent: Aug. 18, 2015

(54) GUIDE DEVICE

(75) Inventors: Robert Simm, Oekingen (CH); Thomas Bannwart, Wiedlisbach (CH)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 13/605,162

(22) Filed: Sep. 6, 2012

(65) Prior Publication Data

US 2013/0234381 A1 Sep. 12, 2013

(30) Foreign Application Priority Data

Sep. 7, 2011 (DE) .......................... 10 2011 082 268

(51) Int. Cl.
*B25B 3/00* (2006.01)
*B23Q 9/00* (2006.01)

(52) U.S. Cl.
CPC .............. *B23Q 9/0014* (2013.01); *B23Q 9/005* (2013.01); *B23Q 9/0071* (2013.01)

(58) Field of Classification Search
USPC ............................................................ 261/1
See application file for complete search history.

(56) References Cited

U.S. PATENT DOCUMENTS

| | | | | |
|---|---|---|---|---|
| 745,515 A * | 12/1903 | Perks | | 30/292 |
| 887,515 A * | 5/1908 | Perks | | 269/1 |
| 905,357 A * | 12/1908 | Perks | | 269/1 |
| 2,080,456 A * | 5/1937 | Bouget | | 269/3 |
| 2,208,412 A * | 7/1940 | Doniger | | 269/1 |
| 2,238,558 A * | 4/1941 | Edgren | | 269/1 |
| 2,605,547 A * | 8/1952 | Tweeten | | 269/1 |
| 2,942,633 A * | 6/1960 | King | | 83/745 |
| 3,373,781 A * | 3/1968 | Grosswald | | 83/745 |
| 3,389,724 A * | 6/1968 | Paul | | 83/875 |
| 3,570,562 A * | 3/1971 | Tracy | | 83/485 |
| 3,586,077 A * | 6/1971 | Pease | | 30/376 |
| 3,624,235 A * | 11/1971 | Kleid | | 156/530 |
| 4,059,038 A * | 11/1977 | Rietema | | 83/745 |
| 4,381,103 A * | 4/1983 | Ferdinand et al. | | 269/1 |
| 4,390,309 A * | 6/1983 | Fangmann | | 408/76 |
| 4,405,117 A * | 9/1983 | Ohlaug | | 266/66 |
| 4,608,898 A * | 9/1986 | Volk | | 83/745 |
| 4,630,657 A * | 12/1986 | Obradovich | | 144/144.52 |
| 4,736,523 A * | 4/1988 | Hanning | | 33/42 |
| 4,867,425 A * | 9/1989 | Miraglia, Jr. | | 269/1 |
| 4,919,384 A * | 4/1990 | Grimberg | | 248/646 |
| 4,977,938 A * | 12/1990 | Greeson | | 144/154.5 |
| 5,345,986 A * | 9/1994 | Kieffer | | 144/372 |
| 5,365,820 A * | 11/1994 | Mori | | 83/455 |
| 5,442,984 A * | 8/1995 | Tate | | 83/471.2 |
| 5,740,847 A * | 4/1998 | Lakso | | 144/144.52 |
| 6,079,309 A * | 6/2000 | Molburg | | 83/745 |
| 6,588,468 B1 * | 7/2003 | Tucker et al. | | 144/372 |
| 6,755,597 B2 * | 6/2004 | Bergner et al. | | 409/178 |
| 7,007,731 B2 * | 3/2006 | Chiu et al. | | 144/372 |
| 7,290,350 B2 * | 11/2007 | Lee | | 33/640 |
| 7,621,206 B2 * | 11/2009 | Makropoulos | | 83/574 |
| 8,459,906 B1 * | 6/2013 | Schmitt | | 408/97 |
| 2003/0233922 A1 * | 12/2003 | Makropoulos | | 83/574 |
| 2004/0081524 A1 * | 4/2004 | Barnett | | 409/132 |

* cited by examiner

*Primary Examiner* — Lee D Wilson
*Assistant Examiner* — Alvin Grant
(74) *Attorney, Agent, or Firm* — Maginot, Moore & Beck LLP

(57) ABSTRACT

A guide device to guide portable power tools on a constrained guidance unit includes at least one base body unit and at least one guide unit. The base body unit, in at least one operating state, is disposed on a side of a seating unit of a portable power tool that faces away from a housing of the portable power tool. The guide unit is configured to positively connect to the constrained guidance unit. The guide unit is also movably mounted to the base body unit.

14 Claims, 6 Drawing Sheets

GUIDE DEVICE

This application claims priority under 35 U.S.C. §119 to patent application no. DE 10 2011 082 268.2, filed on Sep. 7, 2011 in Germany, the disclosure of which is incorporated herein by reference in its entirety.

BACKGROUND

There are already known guide devices for constrained guidance of portable power tools on a constrained guidance unit, which devices comprise a base body unit and a guide unit configured to positively connect to the constrained guidance unit. The base body unit, in at least one operating state, is disposed on a side of a seating unit of a portable power tool that faces away from a housing of the power tool.

SUMMARY

The disclosure is based on a guide device for constrained guidance of portable power tools on a constrained guidance unit, comprising at least one base body unit that, in at least one operating state, is disposed on a side of a seating unit of a portable power tool that faces away from a housing of the power tool, and comprising at least one guide unit configured to positively connect to the constrained guidance unit.

It is proposed that the guide unit is movably mounted on the base body unit. "Constrained guidance" is to be understood here to mean, in particular, guidance of the portable power tool during a movement in a plane along a defined path through an action of at least one constraining force upon the portable power tool transversely in relation to a direction of movement. The expression "constraining force" is intended here to define, in particular, a force provided to prevent a body from moving in at least one direction and/or to keep the body, during a movement, on a path defined through an action of the force upon the body. The guide device is preferably provided to guide the portable power tool linearly, by acting in combination with the constrained guidance unit. The constrained guidance unit is preferably a guide rail.

The term "portable power tool" is intended here to define, in particular, a power tool, configured to machine workpieces, that is transported by an operator without a transport machine. The portable power tool has, in particular, a mass of less than 40 kg, preferably less than 10 kg, and particularly preferably less than 5 kg. Particularly preferably, the portable power tool is a router. It is also conceivable, however, that the portable power tool has a different configuration, considered appropriate by persons skilled in the art, such as, for example, a compass saw, a power drill, a rotary and/or chipping hammer, etc. The guide device, the constrained guidance unit and the portable power tool together preferably constitute a machining system.

A "seating unit" is to be understood here to be, in particular, a unit that, during machining of a workpiece with the portable power tool, the portable power tool being handled in the correct manner, is seated on the workpiece, in particular with a seating surface of the seating unit, and which is provided to support the portable power tool on the workpiece during machining of the workpiece. Particularly preferably, the seating unit is a sliding pad and/or a base plate. Preferably, during machining of a workpiece, when the portable power tool is decoupled from the guide device, the portable power tool slides, via the seating unit, in particular with the seating surface of the seating unit, on the surface of the workpiece to be machined.

A "guide unit" is to be understood here to be, in particular, a unit provided to exert a constraining force upon the portable power tool, via the base body unit, at least along a direction perpendicular to a direction of movement of the portable power tool, when the guide unit is coupled to the constrained guidance unit, to define a capability of the portable power tool to move along the direction of movement.

The expression "movably mounted on" is intended here to define, in particular, a mounting of the guide unit on the base body unit, wherein the guide unit, in particular decoupled from an elastic deformation of the guide unit, has a capability to move along at least a distance greater than 1 mm, preferably greater than 10 mm, and particularly preferably greater than 20 mm, and/or having a capability to move about at least one axis by an angle greater than 10°, preferably greater than 45°, and particularly preferably greater than 60°, bearing forces of the guide unit that occur upon a movement of the guide unit relative to the base body unit being transferred, decoupled from the portable power tool, to the base body unit. The base body unit is preferably a base plate. Particularly preferably, the portable power tool, when coupled to the guide device, is disposed on a side of the base body unit that faces toward the portable power tool. The seating surface of the seating unit, when coupled to the guide device, is thus seated on the base body unit.

The configuration according to the disclosure enables an advantageously compact guide device. The base body unit and the guide unit, when fastened to the seating unit of the portable power tool, are disposed, advantageously, in a captive manner on the portable power tool. In addition, when the guide unit is connected to the constrained guidance unit, a seating surface of the seating unit of the portable power tool, when connected to the base body unit, is aligned, advantageously, at least substantially parallelwise in relation to a surface of a workpiece to be machined. As a result, advantageously, exact working results are achieved.

Advantageously, the guide unit is mounted in a translationally movable manner on the base body unit. In particular, the guide unit has a maximum movement distance, relative to the base body unit, that is greater than 5 mm, preferably greater than 10 mm, and particularly preferably greater than 20 mm. Advantageously, a position of the guide unit relative to the base body unit is adapted to differing dimensions of various constrained guidance units.

Furthermore, it is proposed that the base body unit has at least one seating surface that, in at least one operating state, is provided to be seated on a workpiece to be machined. Preferably, the seating surface is provided to be seated on a surface of a workpiece to be machined when the guide unit is connected to the constrained guidance unit. When the portable power tool is guided in a constrained manner by the base body unit, the guide unit and the constrained guidance unit act in combination while a workpiece is machined by an insert tool disposed in a tool receiver of the portable power tool. The seating surface thus glides on the surface of the workpiece. It is thus ensured, advantageously, that the portable power tool is guided with precision and is supported securely. In addition, advantageously, precise machining of a workpiece is realized using the portable power tool when the guide device is used.

Further, it is proposed that the guide device has at least one fine setting unit configured to finely set a position of the guide unit relative to the base body unit, the fine setting unit is disposed, at least partially, on the base body unit. A "fine setting unit" is to be understood here to mean, in particular, a unit provided to set, relative to the constrained guidance unit, with a transforming unit, a distance of a peripheral region of a recess of the base body unit in relation to a receiver and/or a bushing of a tool receiver of the portable power tool, in particular in relation to a receiver and/or a bushing of an insert tool disposed in the tool receiver of the portable power tool. The transforming unit is provided to transform a large actuation travel of a control element that is actuated by an operator, into a small positioning travel of the guide unit. Preferably, the transforming unit of the fine setting unit is a threaded unit. It is also conceivable, however, that the transforming unit has a different configuration, considered appropriate by persons skilled in the art, such as, for example, a ramp unit, in which two ramps of opposing alignment slide on each other, etc. The fine setting unit preferably has a control element, which is a rotary knob. Further, the fine setting unit preferably has a threaded rod, which is connected to a threaded sleeve of the fine setting unit that is actuated via the control element. Particularly preferably, the fine setting unit is provided to actively set a setting of a relative distance of a peripheral region of a recess of the base body unit in relation to the constrained guidance unit. Preferably, the fine setting unit comprises at least one indicating element such as, for example, a scale ring, an LC display, etc., configured to indicate a relative distance of the peripheral region or of a center point of the recess of the base body unit in relation to the constrained guidance unit. The configuration according to the disclosure advantageously enables a relative distance of the peripheral region or of the center point of the recess of the base body unit to be adjusted in relation to the constrained guidance unit. It is thus possible, advantageously, to achieve precise setting of the guide device and a precise working result.

In addition, it is proposed that the guide device has at least one locking unit configured to lock a position of the guide unit relative to the base body unit. The locking unit is disposed, at least partially, on the base body unit. Particularly preferably, the locking unit is provided to fix the guide unit in a desired position relative to the base body unit, with at least one positive and/or one non-positive element of the locking unit. Positioning of the guide unit is achieved in a particularly advantageous and structurally simple manner. A high repetition accuracy is thus achieved, advantageously, in the case of multiple machining of a workpiece and/or in the case of machining of differing workpieces.

Advantageously, the guide unit has at least one guide element, which is positively connected to a coupling element of the constrained guidance unit. Preferably, the guide element is a guide groove, in which the coupling element of the constrained guidance unit engages when in a coupled state. The coupling element of the constrained guidance unit is thus preferably a guide web. It is also conceivable, however, that the guide element is a guide web, and the coupling element is a guide groove. A positive connection between the guide unit and the constrained guidance unit is configured in a structurally simple manner to achieve constrained guidance of the portable power tool.

Preferably, the guide unit has at least one further guide element, which is positively connected to an alternative coupling element of an alternative constrained guidance unit. Preferably, the alternative coupling element of the alternative constrained guidance unit has a dimension that differs from the coupling of the constrained guidance unit, in particular a different width. Preferably, the further guide element is a guide groove, in which a coupling element of an alternative constrained guidance unit engages when coupled to the guide element, the coupling element being a guide web. It is also conceivable, however, that the further guide element has a different configuration, considered appropriate by persons skilled in the art. Advantageously, a broad spectrum of application of the guide device is possible. It is thus possible, advantageously, to achieve a high degree of compatibility with differing constrained guidance units.

In a preferred configuration of the guide device, the guide element and the further guide element are offset at least substantially parallelwise in relation to each other. "Substantially parallelwise" is to be understood here to mean, in particular, an alignment of a direction relative to a reference direction, in particular in one plane, the direction deviating from the reference direction by, in particular, less than 8°, advantageously less than 5°, and particularly advantageously less than 2°. In this case, preferably, at least one side wall of the guide element and one side wall of the further guide element run at least substantially parallelwise in relation to each other. Advantageously, to achieve constrained guidance of a portable power tool, differing constrained guidance units are used in respect of a configuration of a coupling element.

Furthermore, it is proposed that the guide unit has at least one variation element, which is provided to set at least one characteristic quantity of a guide range constituted, at least partially, by the guide element. A "guide region" is to be understood here to mean, in particular, a region of the guide unit that is constituted, at least partially, by the guide element and that is provided to achieve a constrained guidance along at least one movement path, in particular as the guide unit is being moved when the guide element and the coupling element are in a coupled state, by acting in combination with a component that corresponds to the guide region, in particular with a component engaging in the guide region. The guide region is preferably a recess delimited by guide surfaces. Preferably, to achieve constrained guidance, the coupling element, when in a coupled state, engages in the guide region. Preferably, in at least one variation state, two side walls of the guide element that run at least substantially parallelwise in relation to each other constitute two guide surface of the guide region that delimit the recess.

The term "variation element" is intended here to define, in particular, an element that, through alteration of a position, alters a characteristic quantity of a component, region, etc. acting in combination with the variation element. The characteristic quantity is preferably a relative distance of two guide surfaces of the guide region, which distance extends at least substantially perpendicularly in relation to at least one side wall of the guide element that delimits the guide region and constitutes at least one guide surface of the guide region, in particular a relative distance of a side wall of the guide element, which side wall constitutes a guide surface of the guide region, and a guide surface of the variation element, which guide surface faces toward the side wall. It is also conceivable, however, that the characteristic quantity is a different parameter considered appropriate by persons skilled in the art, such as, for example, a disposition of pins and/or continuations relative to each other to code a connection between the guide device and the constrained guidance unit.

The expression "substantially perpendicularly" is intended here to define, in particular, an alignment of a direction relative to a reference direction, the direction and the relative direction, in particular as viewed in one plane, enclosing an angle of 90° and the angle having a maximum deviation of, in particular, less than 8°, advantageously less than 5°, and particularly advantageously less than 2°. The configuration of the guide device according to the disclosure advantageously enables adaptation of the guide region to components that act in combination with the guide region to achieve constrained guidance of the portable power tool. Thus, advantageously, it is possible to achieve a high degree of flexibility in respect of a spectrum of application of the guide device to achieve constrained guidance of the portable power tool.

Further, the disclosure is based on a guide system for portable power tools, in particular a linear guide system, comprising at least one guide device, which is fixed to the portable power tool, and comprising at least one constrained guidance unit, to which the guide unit of the guide device is positively connected to achieve constrained guidance of the portable power tool. Preferably, the portable power tool and the guide system together constitute a machining system. Advantageously, combined action of the guide device and the constrained guidance unit enables the portable power tool to be guided in a reliable manner during machining of a workpiece.

The guide device according to the disclosure and/or the guide system according to the disclosure in this case are not intended to be limited to the application and embodiment described above. In particular, to fulfill a mode of operation described herein, it is possible that the portable guide device according to the disclosure and/or the guide system according to the disclosure have a number of individual elements, components and units that differs from a number stated herein.

BRIEF DESCRIPTION OF THE DRAWINGS

Further advantages are given by the following description of the drawing. The drawing shows an exemplary embodiment of the disclosure. The drawing, the description and the claims contain numerous features in combination. Persons skilled in the art will also expediently consider the features individually and combine them to create appropriate further combinations.

In the drawing.

DETAILED DESCRIPTION

Figure 1:
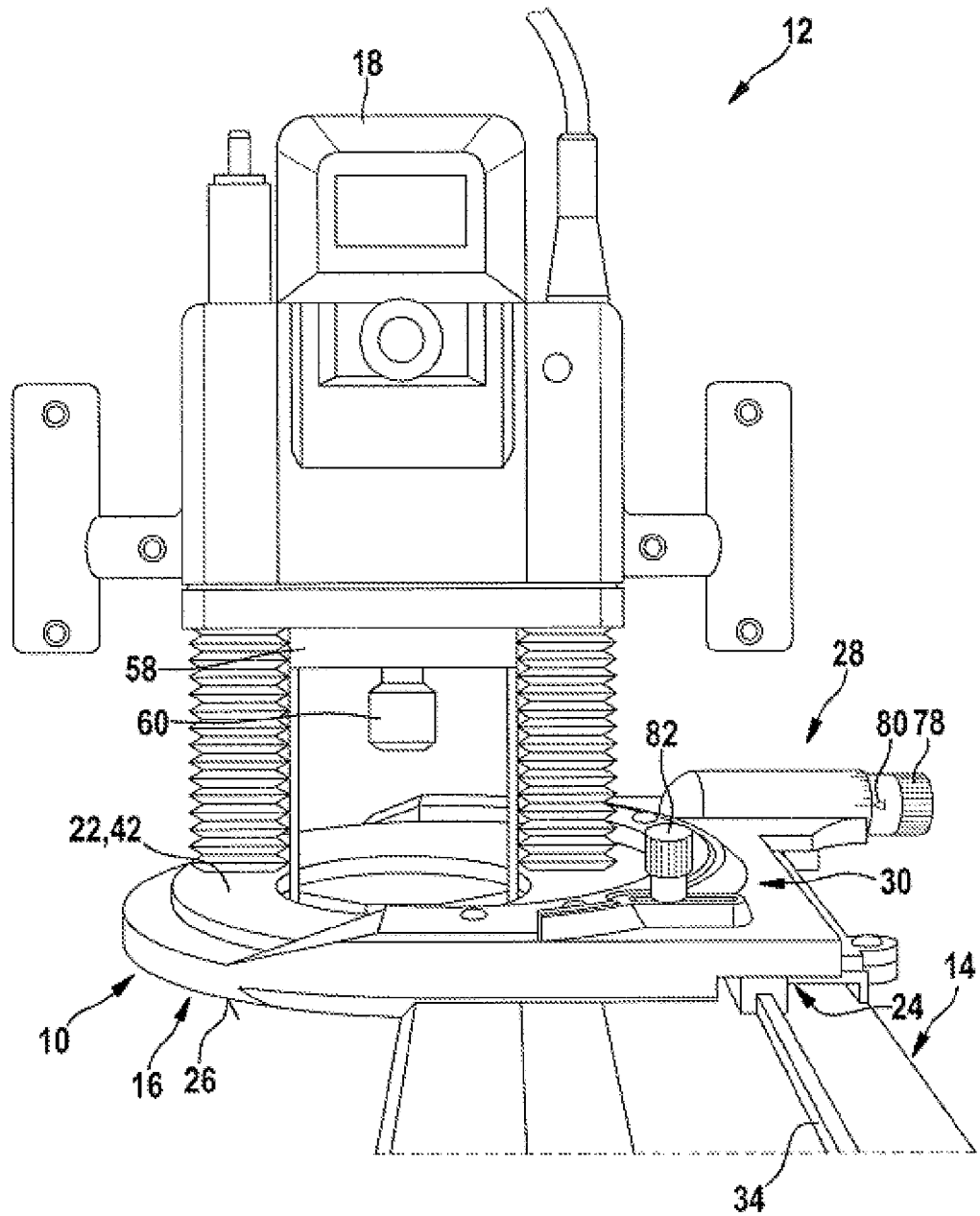
FIG. 1 in a schematic representation, shows a machining system, comprising a portable power tool, a guide system, and a constrained guidance unit, FIG. 2 in a schematic representation, shows a detail view of the guide device demounted from the portable power tool, FIG. 3 in a schematic representation, shows a further detail view of the guide device demounted from the portable power tool, FIG. 4 in a schematic representation, shows a detail view of a variation element of a guide unit of the guide device, FIG. 5 in a schematic representation, shows a detail view of the guide unit of the guide device demounted from a base body unit of the guide device, and FIG. 6 in a schematic representation, shows a further detail view of the guide unit of the guide device demounted from the base body unit of the guide device.

FIG. 1 shows a machining system, which comprises a guide system for portable power tools and comprises a portable power tool 12 configured as a router. The guide system is configured as a linear guide system. The guide system in this case comprises a guide device 10, which is fixed to the portable power tool 12, and comprises a constrained guidance unit 14, to which a guide unit 24 of the guide device 10 is positively connected to achieve constrained guidance of the portable power tool 12. The portable power tool 12, configured as a router, is at least substantially of a configuration already known to persons skilled in the art. The portable power tool 12 comprises a seating unit 22, which is configured as a base plate 42, to which the guide device 10 is fixed with fixing elements, configured as screws (not represented in greater detail herein), of the guide device 10. To achieve constrained guidance of the portable power tool 12 on the constrained guidance unit 14, the guide device 10 in this case has a base body unit 16. In one operating state, the base body unit 16 is disposed on a side 20 of the seating unit 22 of the portable power tool 12 that faces away from a housing 18 of the power tool. The base body unit 16 in this case is fixed to the side 20 of the seating unit 22 that faces away from the power tool housing 18 with fixing elements, configured as screws (not represented in greater detail herein), of the guide device 10. It is also conceivable, however, that the base body unit 16 is fixed to the seating unit 22 with other fixing elements considered appropriate by persons skilled in the art, such as, for example, bayonet closure elements or latching elements.

Figure 2:
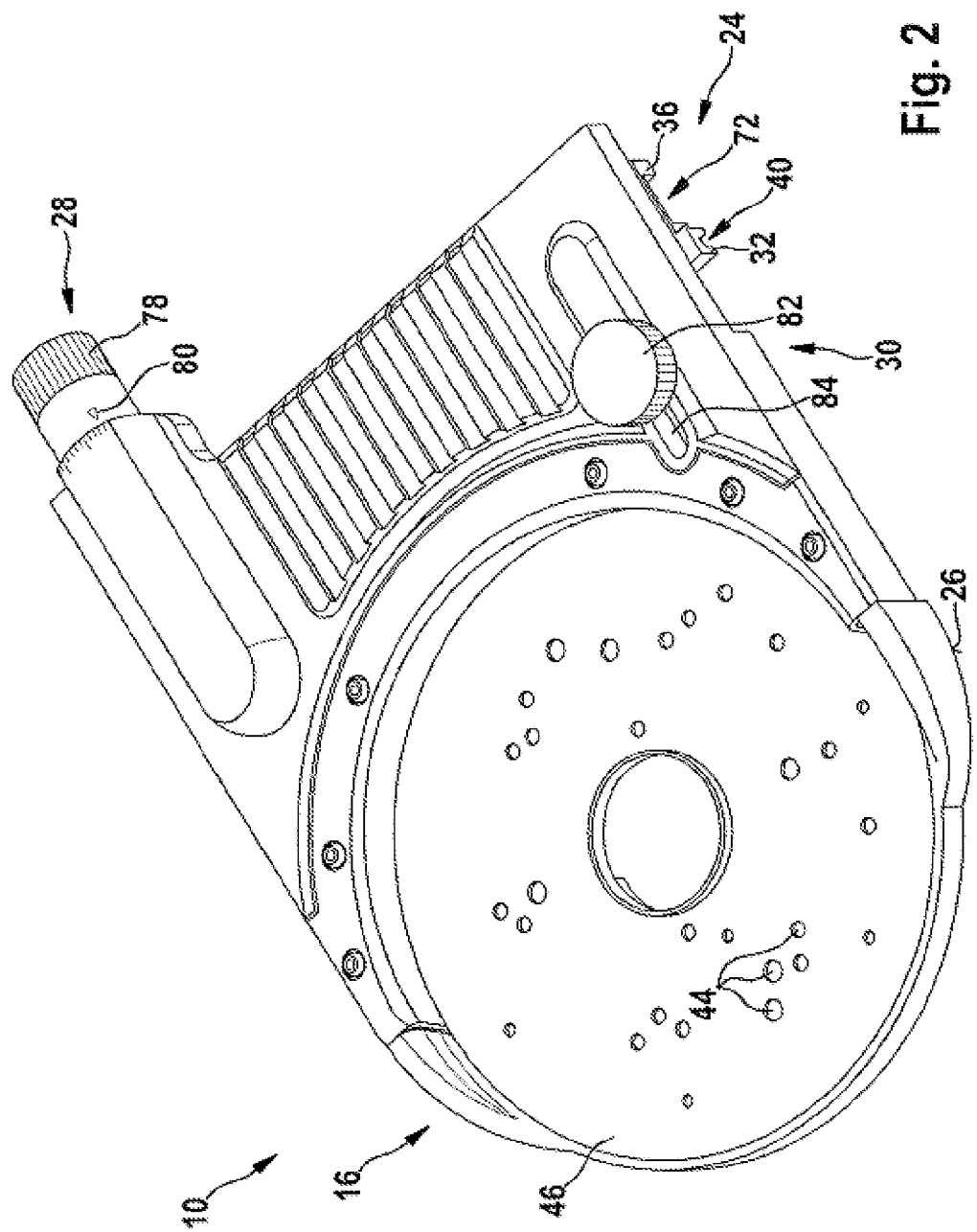

To fix the base body unit 16 to the seating unit 22, the fixing elements, configured as screws, extend through recesses 44 of a stiffening element 46 of the base body unit 16 and, via a screw head of the screws, bear against the stiffening element 46 (FIG. 2). The stiffening element 46 is a metal plate such as, for example, an aluminum plate, which is fastened to the base body unit 16 with fastening elements such as, for example, screws, rivets, etc. It is also conceivable, however, that the stiffening element 46 is a single piece with the base body unit 16. In addition, the stiffening element 46 has a multiplicity of recesses 44, which are configured to receive fixing elements (not represented in greater detail herein) configured to fasten the base body unit 16 to various configurations of differing portable power tools configured as routers. In this case, the number of the recesses 44 and the disposition of the recesses 44 correspond to the number and disposition of recesses of portable power tools, configured as routers, to which the base body unit 16 is able to be fixed.

In addition, the base body unit 16 has a seating surface 26, which, in at least one operating state, is configured to be seated on a workpiece to be machined (not represented in greater detail herein). The seating surface 26 is configured to be seated on a surface of a workpiece to be machined when the guide unit 24 is connected to the constrained guidance unit 14. In the case of constrained guidance of the portable power tool 12 by the base body unit 16, the guide unit 24 and the constrained guidance unit 14 acting in combination, during machining of a workpiece with an insert tool (not represented here) disposed in a tool receiver 60 of the portable power tool 12, the seating surface 26 thus glides on the surface of the workpiece to be machined. The workpiece receiver 60 in this case extends out of an under-part 58 of the power tool housing 18, in the direction of the seating unit 22.

Figure 3:
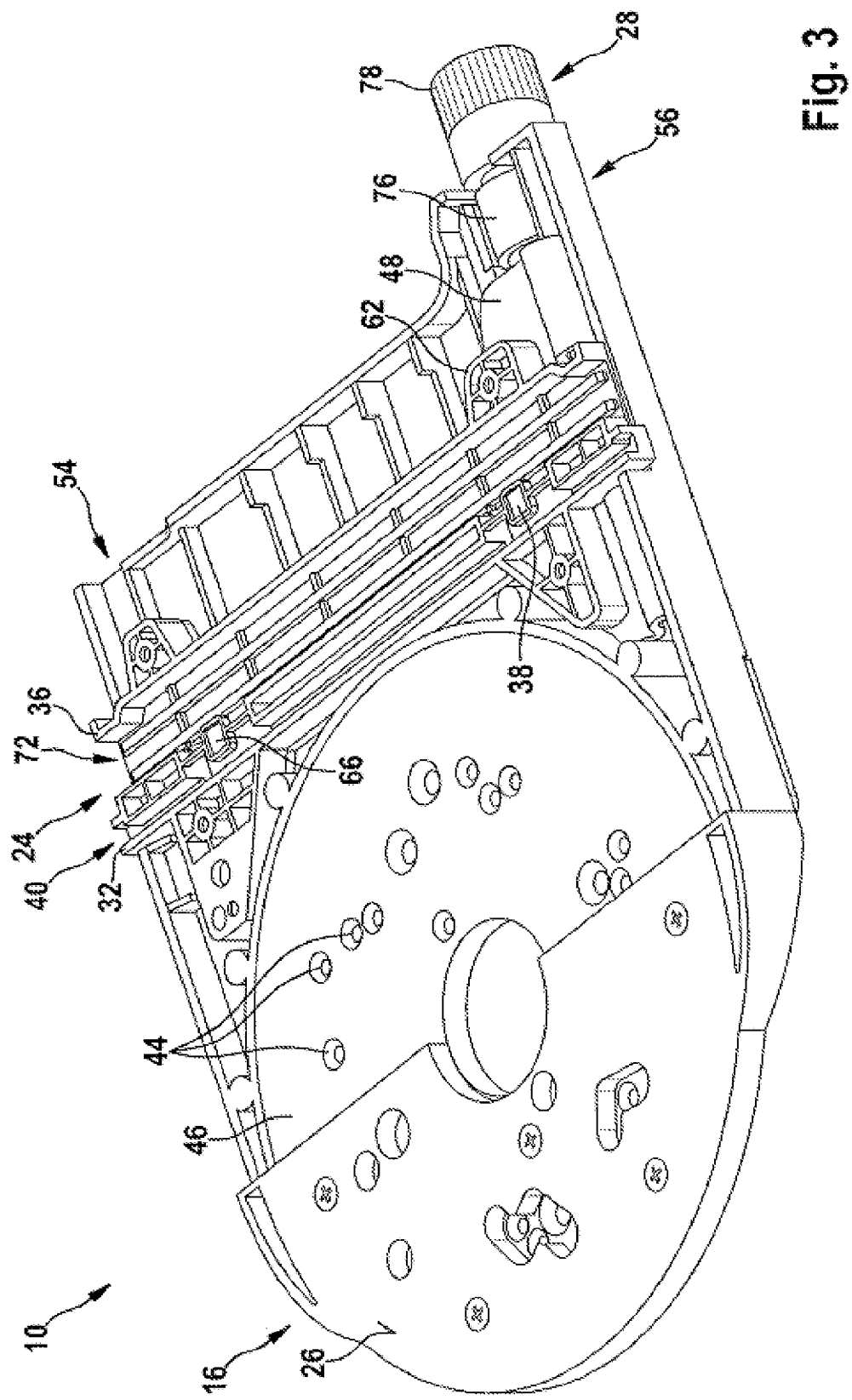

To achieve constrained guidance of the portable power tool 12 on the constrained guidance unit 14, the guide device comprises the guide unit 24, which is configured to positively connect to the constrained guidance unit 14. The guide unit 24 is movably mounted on the base body unit 16 (FIGS. 2 and 3). The guide unit 24 in this case is mounted in a translationally movable manner on the base body unit 16. To movably mount on the base body unit 16, the guide unit 24 has a carrier element 48, which comprises two bearing regions 50, 52. When the guide unit 24 is mounted, the bearing regions 50, 52 are each disposed in a guide region 54, 56 of the base body unit 16. The two bearing regions 50, 52 in this case are aligned at least substantially perpendicularly in relation to each other. One of the two bearing regions 50, 52 extends at least substantially parallelwise in relation to a movement plane of the guide unit 24 in which the guide unit 24 is translationally movable, and one of the two bearing regions 50, 52 extends at least substantially perpendicularly in relation to the movement plane of the guide unit 24. The two bearing planes 50, 52 are each disposed on sides of the carrier element 48 that face away from each other. The carrier element 48 is composed of steel material. It is also conceivable, however, that the carrier element 48 is composed of a different material considered appropriate by persons skilled in the art, such as, for example, carbon, aluminum, etc. In addition, it is also conceivable that the bearing regions 50, 52 have a different alignment, considered appropriate by persons skilled in the art, relative to each other and/or on the carrier element 48.

Figure 6:
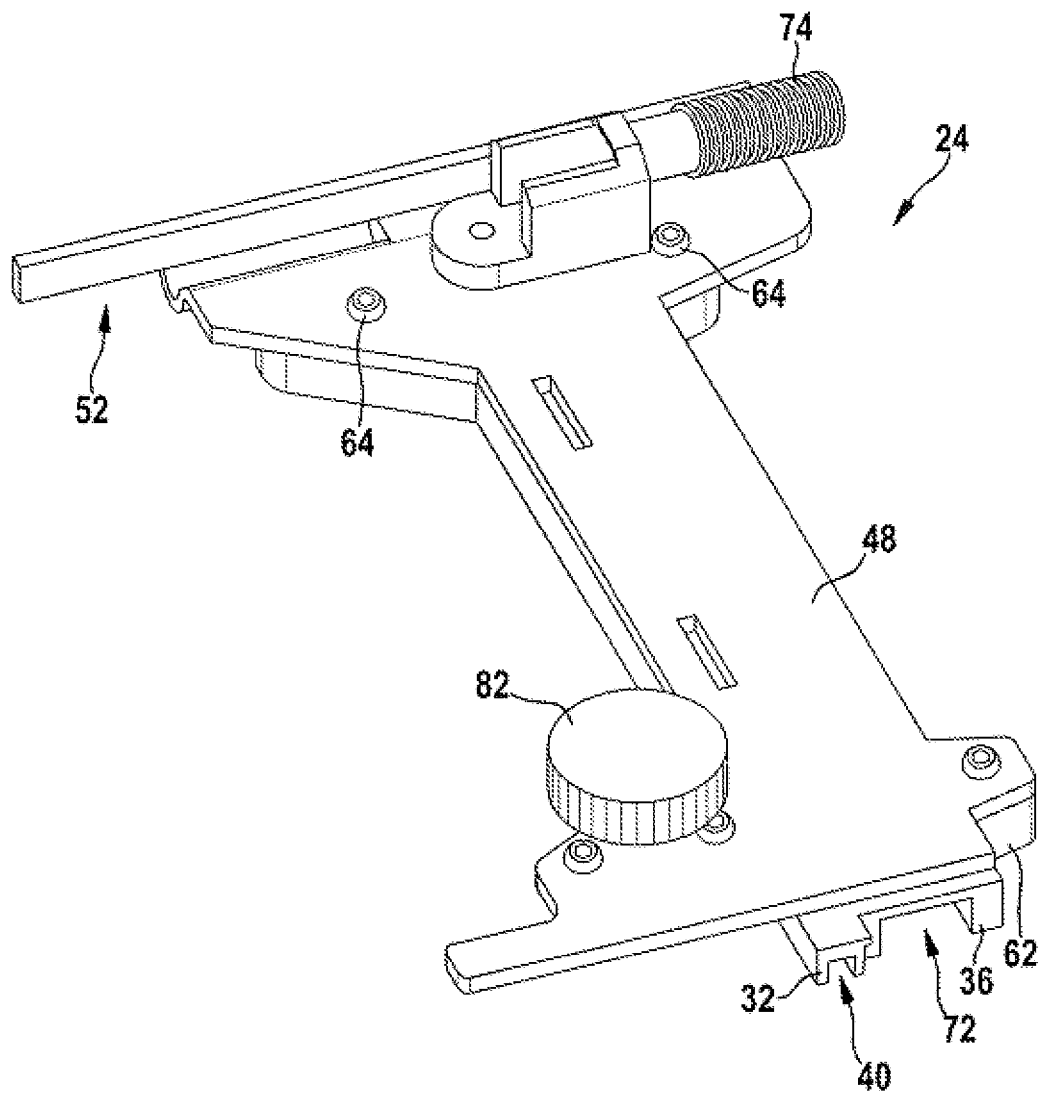

In addition, the guide unit has a guide element 32, which is positively connected to a coupling element 34 of the constrained guidance unit 14. The guide element 32 is a guide groove (FIG. 2). In this case, the guide element 32 delimits a guide region 40, in which the coupling element 34 is disposed when positively connected to the guide element 32. The coupling element 34 of the constrained guidance unit 14 is a guide web, which, when coupled to the guide element 32, engages in the guide element 32, or guide groove (FIG. 1). The guide element 32 in this case is a single piece with a guide carrier element 62 of the guide unit 24, which guide carrier element is fastened to the carrier element 48 with screws 64 (FIG. 6). It is also conceivable, however, that the guide carrier element 62 is fastened to the carrier element 48 with a different fastening element considered appropriate by persons skilled in the art, or that the guide carrier element 62 is a single piece with the carrier element 48. Further, the guide unit 24 comprises a further guide element 36, which is positively connected to an alternative coupling element (not represented in greater detail herein) of an alternative constrained guidance unit (not represented in greater detail herein). The further guide element 36 in this case is likewise a single piece with the guide carrier element 62. The guide element 32 and the further guide element 36 are offset at least substantially parallelwise in relation to each other. Further, two side walls of the further guide element 36 that extend substantially parallelwise in relation to each other delimit a further guide region 72, in which the alternative coupling element is disposed when positively coupled to the further guide element 36.

Figure 4:
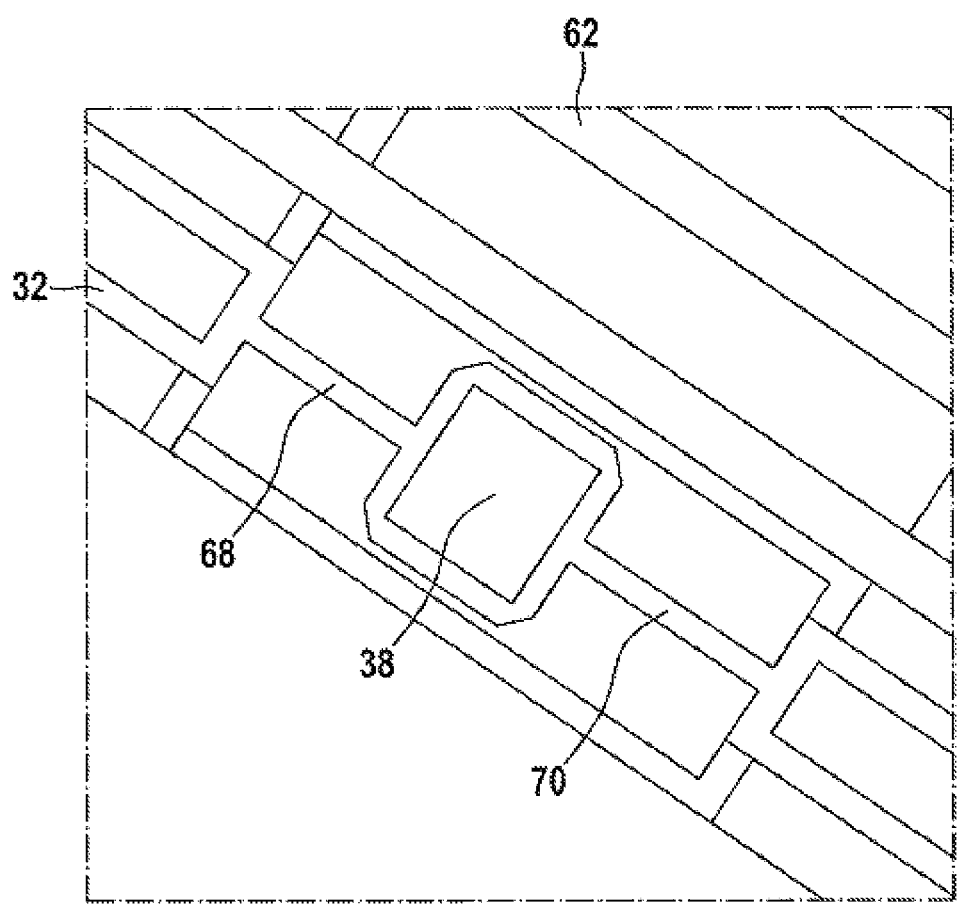
Figure 5:
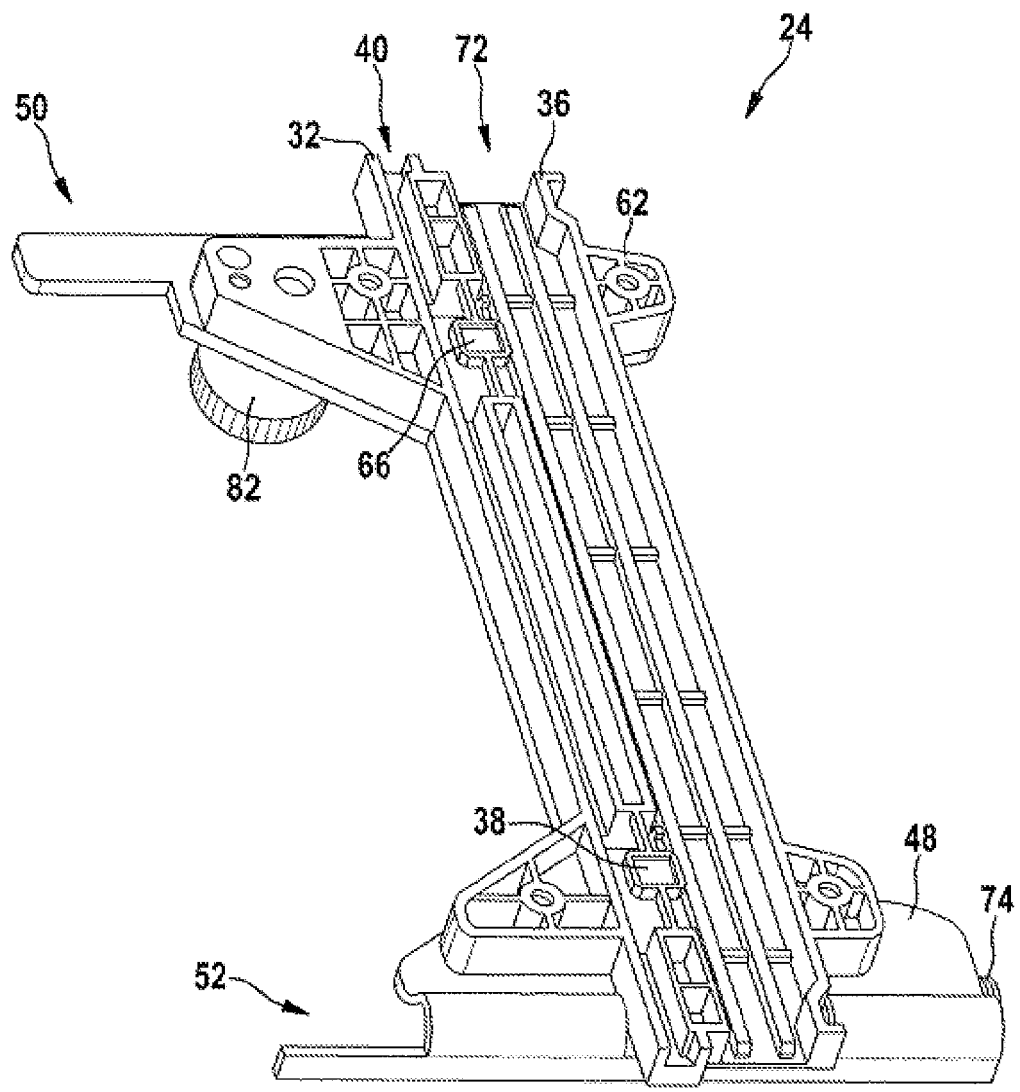

Furthermore, the guide unit 24 has two variation elements 38, 66, which are configured to set a characteristic quantity of the guide region 40 partially constituted by the guide element 32 (FIGS. 3 and 5). It is also conceivable, however, that the guide unit 24 has a number other than two variation elements 38, 66. The two variation elements 38, 66 are disposed in a movable manner on the guide carrier element 62. The two variation elements 38, 66 in this case are disposed, at least substantially parallelwise in relation to the movement plane of the guide unit 24, in a movable manner on the guide carrier element 62. With a bias element 68, 70, the two variation elements 38, 66 are each connected to the guide carrier element 62 at two sides of the variation elements 38, 66 that face away from each other (FIG. 4). The bias elements 68, 70 are elastically deformable webs that, because of a material property of the elastically deformable webs and/or because of a given shape, are biased in the direction of a side wall of the guide element 32 that delimits the guide region 40 and constitutes at least one guide surface of the guide region 40. In this case, because of a material property and/or because of a given shape, the bias elements 68, 70, or elastically deformable webs, are elastically deformable along a direction, extending at least substantially parallelwise in relation to the movement plane of the guide unit 24, in the direction of the side wall of the guide element 32 that delimits the guide region 40 and that constitutes at least one guide surface of the guide region 40, and contrary to this direction, by a deformation distance such as, for example, a flexure f, which is greater than 0.5 mm. It is also conceivable, however, that the variation elements 38, 66 are connected to the guide carrier element 62 and biased with different elements considered appropriate by persons skilled in the art. In an alternative configuration of the guide unit 24 it is conceivable, for example, that the variation elements 38, 66 are mounted on the guide carrier element 62 so as to be movable relative to the guide carrier element 62 and are biased with spring elements such as, for example, compression springs, in the direction of the side wall of the guide element 32 that delimits the guide region 40 and that constitutes at least one guide surface of the guide region 40.

The guide element 32, together with the two variation elements 38, 66, delimits the guide region 40 in which the coupling element 34 is disposed, when coupled to the guide element 32, to achieve constrained guidance of the portable power tool 12. The characteristic quantity is constituted by a relative distance of two guide surfaces of the guide region 40, which relative distance extends at least substantially perpendicularly in relation to the side wall of the guide element 32 that delimits the guide region 40 and that constitutes at least one guide surface of the guide region 40. The two variation elements 38, 66 in this case constitute two further guide surfaces of the guide region 40, which extend at least substantially parallelwise in relation to the guide surface constituted by the side wall of the guide element 32 (FIG. 2). During a movement of the guide unit 24 along a direction extending at least substantially parallelwise in relation to the guide surfaces of the two variation elements 38, 66, the coupling element 34, when disposed in the guide region 40, thus slides on the side wall of the guide element that delimits the guide region 40 and that constitutes a guide surface of the guide region 40, and on the guide surfaces of the two variation elements 38, 66.

In the case of the guide region 40 being coupled to a further, alternative coupling element (not represented in greater detail herein) of a further, alternative constrained guidance unit (not represented in greater detail herein), which coupling element has dimensions that differ from those of the coupling element 34 of the constrained guidance unit 14, the variation elements 38, 66 are moved contrary to a bias force of the bias elements 68, 70, to enable the further, alternative coupling element to be inserted in the guide region 40. The further, alternative coupling element, as viewed along a direction extending at least substantially perpendicularly in relation to guide surfaces of the further, alternative coupling element that extend substantially parallelwise in relation to each other, has a dimension that is greater than a dimension of the coupling element 34 of the constrained guidance unit 14, as viewed along a direction extending at least substantially perpendicularly in relation to guide surfaces of the coupling element 34 that extend at least substantially parallelwise in relation to each other.

Furthermore, the guide device has a fine setting unit 28 to finely set a position of the guide unit 24 relative to the base body unit 16, the fine setting unit 28 is disposed, at least partially, on the base body unit 16 (FIG. 2). The fine setting unit 28 in this case has a transmission element 74, which is fastened to the carrier element 48 (FIG. 6). The transmission element 74 is a threaded rod. Further, the fine setting unit 28 has a further transmission element 76, configured to effect a translational movement of the guide unit 24 relative to the base body unit 16, by acting in combination with the transmission element 74 or threaded rod (FIG. 3). The further transmission element 76 is a transmission sleeve, which is mounted in a rotatable and axially non-displaceable manner on the base body unit 16. The transmission element 74 and the further transmission element 76 together constitute a transforming unit. In addition, the fine setting unit 28 has a control element 78, which is configured to actuate the further transmission element 76 or threaded sleeve (FIG. 3). The control element 78 is a rotary knob, which is actuated by an operator. The rotary knob has a marking that acts in combination with an indicating element 80 of the fine setting unit 28 and, in a unit of measurement, indicates to an operator a positioning travel distance traveled by the guide unit 24 as a result of an actuation of the fine setting unit 28. It is also conceivable, however, that the fine setting unit 28 has a digital indicating element 80, configured to indicate a positioning travel distance of the guide unit 24 to an operator. To alter a zero setting or to readjust, the indicating element 80 is mounted to be movable relative to the control element 78, the indicating element 80 moved concomitantly as the control element 78 is rotated.

After a position of the guide unit 24 is set relative to the base body unit 16 with the fine setting element 28, the guide unit 24 is fixed in position relative to the base body unit 16. To fix the guide unit 24, the guide device 10 has a locking unit 30 configured to lock a position of the guide unit 24 relative to the base body unit 16, the locking unit 30 is disposed, at least partially, on the base body unit 16. The locking unit 30 has a clamping element 82 that, by acting in combination with the base body unit 16, enables the guide unit 24 to be fixed in position relative to the base body unit 16 (FIG. 2). The clamping element 82 is a clamping screw that, when mounted, is disposed in a threaded bore of the carrier element 48. The base body unit 16 has a locking recess 84, through which the clamping element 82 extends when mounted. To fix a position of the guide unit 24, the clamping element 82 is screwed into the threaded bore of the carrier element 48, with a rotary motion, until a partial region of the clamping element 82 that is a clamping head bears against the base body unit 16. Through tightening of the clamping element 82, a clamping force is generated, in a manner already known to persons skilled in the art, to fix the guide unit 24 in position relative to the base body unit 16.

What is claimed is:

1. A guide device to guide portable power tools on a constrained guidance unit comprising:
    a seating unit at least partially interposed between a housing of a power tool and a workpiece to be machined;
    at least one base body unit disposed on a side of the seating unit that faces away from the housing, the at least one base body unit having at least one seating surface configured to be seated on the workpiece to be machined; and
    at least one guide unit configured to positively connect to the constrained guidance unit, the at least one guide unit movably mounted on the at least one base body unit for movement in a translational direction relative to the at least one base body unit.

2. The guide device of claim 1, further comprising:
    at least one fine setting unit configured to set a position of the at least one guide unit relative to the at least one base body unit, the at least one fine setting unit disposed, at least partially, on the at least one base body unit.

3. The guide device of claim 1, further comprising:
    at least one locking unit configured to lock a position of the at least one guide unit relative to the base body unit, the at least one locking unit disposed, at least partially, on the at least one base body unit.

4. The guide device of claim 1, wherein the at least one guide unit has at least one guide element positively connected to a coupling element of the constrained guidance unit.

5. The guide device of claim 4, wherein the at least one guide unit has at least one further guide element positively connected to an alternative coupling element of an alternative constrained guidance unit.

6. The guide device of claim 5, wherein the at least one guide element and the at least one further guide element are offset substantially parallelwise relative to each other.

7. The guide device of claim 4, wherein the at least one guide unit has at least one variation element configured to set at least one characteristic quantity of a guide range constituted, at least partially, by the at least one guide element.

8. A guide system for portable power tools comprising:
    at least one guide device fixed to a portable power tool comprising:
        a seating unit at least partially disposed between a housing of a power tool and a workpiece to be machined;
        at least one base body unit disposed on a side of the seating unit that faces away from housing, the at least one base body unit having at least one seating surface configured to be seated on the workpiece to be machined; and
        at least one guide unit movably mounted on the at least one base body unit for movement in a translational direction relative to the at least one base body unit; and
        at least one constrained guidance unit, the at least one guide unit of the guide device positively connected to the at least one constrained guidance unit.

9. The guide system of claim 8, further comprising:
    at least one fine setting unit configured to set a position of the at least one guide unit relative to the at least one base body unit, the at least one fine setting unit disposed, at least partially, on the at least one base body unit.

10. The guide system of claim 8, further comprising:
    at least one locking unit configured to lock a position of the at least one guide unit relative to the base body unit, the at least one locking unit disposed, at least partially, on the at least one base body unit.

11. The guide system of claim 8, wherein the at least one guide unit has at least one guide element positively connected to a coupling element of the constrained guidance unit.

12. The guide system of claim 11, wherein the at least one guide unit has at least one further guide element positively connected to an alternative coupling element of an alternative constrained guidance unit.

13. The guide system of claim 12, wherein the at least one guide element and the at least one further guide element are offset substantially parallelwise relative to each other.

14. The guide system of claim 11, wherein the at least one guide unit has at least one variation element configured to set at least one characteristic quantity of a guide range constituted, at least partially, by the at least one guide element.

* * * * *